United States Patent [19]

Barnard et al.

[11] Patent Number: 4,813,214
[45] Date of Patent: Mar. 21, 1989

[54] RADIAL THROTTLE CONTROL

[75] Inventors: Michael A. Barnard; Anthony F. Beugelsdyk, both of Wichita, Kans.

[73] Assignee: Wescon Products Company, Wichita, Kans.

[21] Appl. No.: 5,102

[22] Filed: Jan. 20, 1987

[51] Int. Cl.$^4$ .................. A01D 69/00; G05G 1/00
[52] U.S. Cl. .................. 56/11.3; 56/10.8; 56/10.5; 74/491; 74/527; 74/502.2; 180/19.3
[58] Field of Search .................. 56/11.3, 10.8, 10.5, 56/17.5, 239; 180/19.1, 19.3; 74/491, 527, 501 B; 192/0.094, 0.096

[56] References Cited

U.S. PATENT DOCUMENTS

| | | | |
|---|---|---|---|
| 3,736,800 | 6/1973 | Gregory | 74/491 |
| 3,943,794 | 3/1976 | Shimada | 74/501 B |
| 4,007,645 | 2/1977 | Dove et al. | 74/501 B |
| 4,205,558 | 6/1980 | Jay | 74/501 B |
| 4,267,742 | 5/1981 | Cabeza | 74/501 B |
| 4,309,862 | 1/1982 | Carlson | 56/10.5 |
| 4,363,206 | 12/1982 | Schmitt | 56/11.3 |
| 4,428,180 | 1/1984 | Carlson | 56/11.3 |
| 4,432,191 | 2/1984 | Schmitt | 56/11.8 |
| 4,455,308 | 8/1984 | Kester et al. | 56/10.5 |
| 4,466,232 | 8/1984 | Beugelsdyk et al. | 56/10.8 |
| 4,580,455 | 4/1986 | Beugelsdyk et al. | 56/11.3 |
| 4,599,912 | 7/1986 | Barnard et al. | 56/11.3 |
| 4,658,667 | 4/1987 | Schuller | 74/527 |

Primary Examiner—John Weiss
Attorney, Agent, or Firm—Hovey, Williams, Timmons & Collins

[57] ABSTRACT

A cable control device for use in connection with a lawnmower throttle control cable or the like is provided which is selectively alterable for positive or negative control action, which maintains the cable in a selected position, and which is adapted for coupling a clutch control bail thereto. The device preferably includes a housing adapted for mounting to a lawnmower handlebar; a body including an operating lever; means rotatably coupling the body with the housing in alternate configurations; and first and second means for pivotally coupling an end of the control cable at respective first and second locations on the body. The device can be used alternatively in a positive action mode whereby forward movement of the operating lever moves the cable forward and in a negative action mode whereby forward movement of the operating lever moves the cable rearward. Additionally, a biased pawl coupled with the housing engages detents formed in the body to hold the cable in a selected position.

11 Claims, 1 Drawing Sheet

U.S. Patent  Mar. 21, 1989  4,813,214
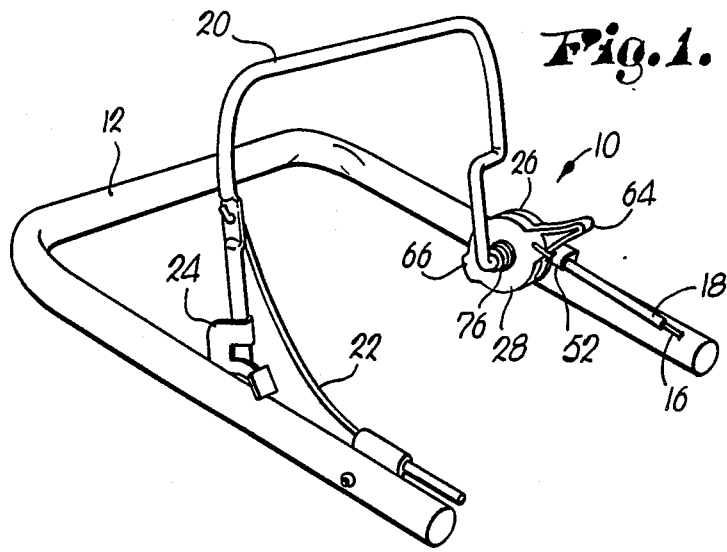
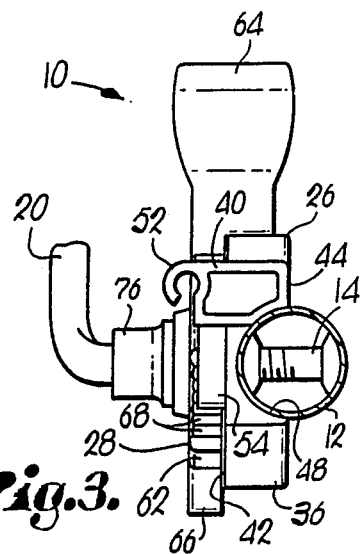
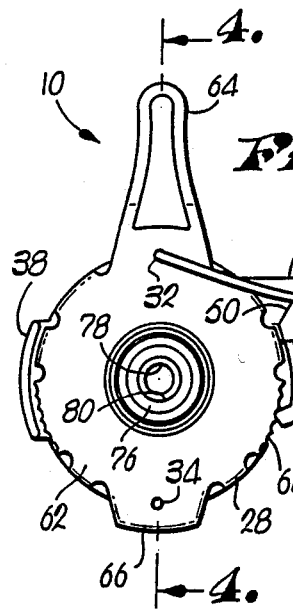
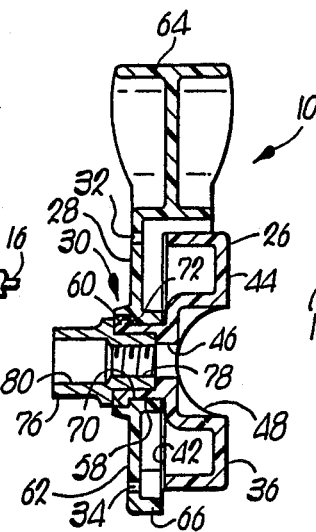
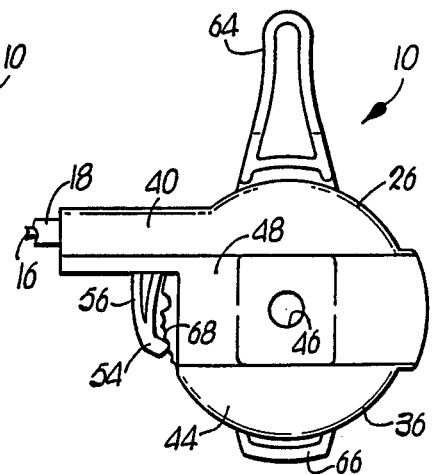
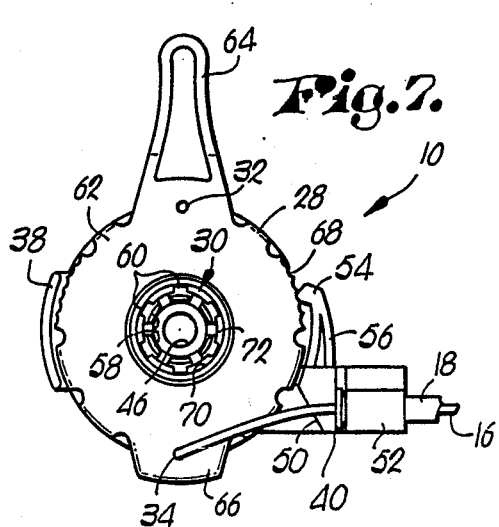
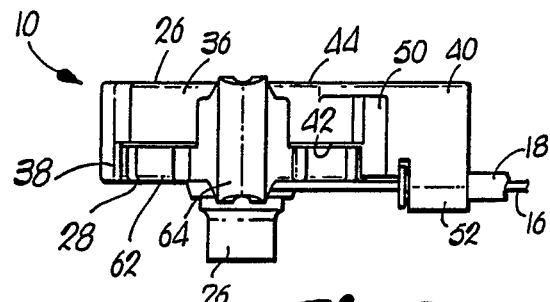

RADIAL THROTTLE CONTROL

BACKGROUND OF THE INVENTION

1. Field of the Invention

This invention relates to a cable control device for use in connection with a lawnmower throttle control cable or the like which is selectively alterable for positive or negative control action. More particularly, it is concerned with a cable control device having a body rotatably coupled, in alternate configurations, to a housing an alternate means for pivotally coupling an end of a control cable at respective first and second locations on the body.

2. Description of the Prior Art

Sheath covered cables are commonly used for providing remote control of various mechanical devices such as lawnmower throttles and bicycle gears. Typically, one exposed end of the cable is attached to the mechanism to be controlled and the other exposed end is coupled with a remote control device. The control device is then operated to slidably position the cable within the sheath thereby controlling the mechanism.

A common type of control device includes a cylindrical body having an operating lever attached thereto which is rotatably coupled with a housing. An exposed end of the cable is attached to the circumference of the body so that rotation of the body translates into linear motion and positioning of the cable within the sheath which in turn positions the mechanism to be controlled attached to the other end of the cable.

Some mechanisms require a positive action control device whereby forward movement of an upstanding lever results in forward linear movement of the control cable. Conversely, some mechanisms require a reverse acting device whereby forward movement of the lever results in rearward movement of the control cable.

From the standpoint of custom, convention, marketing, and consumer preference, it is highly desirable that forward motion of a control lever correspond to increased engine speed, for example when used on a lawnmower control. By the same token it is also highly desirable that the operating lever be upwardly extending for convenient grasp and use.

Thus, a lawnmower equipment manufacturer, for example, must stock two different types of cable control devices depending on the type of engine being used - positive action control or negative action control. Similarly, manufacturers of cable control devices must manufacturer two different types.

These facts particularly point out the need for a cable control device which is selectively alterable between positive action and negative action.

SUMMARY OF THE INVENTION

The problems outlined above are solved by the radial throttle control device described herein. The present radial control device is selectively alterable between positive action and negative action modes and thereby eliminates the need for manufacturing or stocking two different types of control devices.

The control device broadly includes a housing having a centerline therethrough; a body having an axis of rotation and circumference therearound and an operating lever; means rotating and alternately coupling the housing in a first configuration wherein the lever is on one side of the centerline and in a second configuration wherein the lever is on a second opposed side of the centerline; first attachment means for pivotally coupling an end of a cable to the circumference at a first location thereon; and second attachment means for pivotally coupling the end of the cable to the circumference at a second opposed location thereon. The control device has a positive mode wherein the body is coupled with the housing in the first configuration and wherein the cable end is coupled with the circumference at the first location so that forward motion of the lever corresponds to forward motion of the cable. Alternately, the control device has a negative action mode wherein the body is coupled with the housing in a second configuration in which the cable end is coupled with the circumference at the second location so that forward motion of the lever corresponds with rearward motion of the cable.

Preferably, the body includes a plurality of position-defining detents defined on the circumferential edge thereof and the housing includes a detent-engaging pawl biased toward the detents for selectively holding the position of the body and thus the position of the cable. Advantageously, the housing includes a clip for coupling the sheath and thus the cable thereto parallel to the centerline of the housing. Desirably, the housing includes means for preventing the rotation of the lever beyond the centerline, the housing includes means for mounting the device to a lawnmower handle, and includes means whereby a lawnmower clutch control bail is coupled to the device.

BRIEF DESCRIPTION OF THE DRAWINGS

FIG. 1 is a perspective view of the radial throttle control device carried by a lawnmower handle with a clutch control bail coupled thereto;

FIG. 2 is a side elevational view of the device;

FIG. 3 is an front end elevational view of the device carried by a lawnmower handle shown in section and with the control bail shown fragmentarily;

FIG. 4 is a sectional view along line 4—4 of FIG. 2.

FIG. 5 is a side elevational view of the device showing the side opposite to that shown in FIG. 2;

FIG. 6 is a fragmentary plan view of the device; and

FIG. 7 is a side elevational view of a second embodiment of the device.

DESCRIPTION OF THE PREFERRED EMBODIMENTS

FIGS. 1-6 illustrate one embodiment of the control device 10 in its preferred environment of use as part of a lawnmower control system. The lawnmower includes a handle 12 with a fastener hole 14 formed laterally therethrough (FIG. 3), throttle control cable 16 substantially enclosed by sheath 18, clutch control bail 20 coupled with clutch cable 22, and bail stop 24. It is to be understood that control device 10 is useful in many applications for positioning a control cable and is not to be considered limited to that environment herein described as a prferred use.

Control device 10 broadly includes housing 26, body 28, coupling means 30, first cable attachment means 32, and second cable attachment means 34.

Housing 26 is preferably formed of a synthetic resin material and integrally includes cylindrical member 36, rotation stop 38, and extension assembly 40. Housing 26 presents a centerline therethrough which is horizontally disposed as viewed in FIGS. 2 and 5. Additionally, housing 26 presents a front face 42 and a reverse face 44.

Cylindrical member 36 includes a centrally disposed fastener aperture 46 and handle receiving trough 48 defined in reverse face 44 disposed parallel to the centerline of housing 26.

Rotation stop 38 presents an arcuate configuration disposed equally on either side of the centerline of housing 26 and extends outwardly from the front face 42 thereof at the extreme rearward side thereof (extreme leftward side as viewed in FIG. 2).

Extension assembly 40 integrally couples with cylindrical member 36 above the centerline of housing 26 on a side thereof opposed from rotation stop 38. Extension assembly 40 presents stop surface 50, and includes cable sheath clip 52, pawl 54, and pawl biasing spring 56.

Clip 52 presents a three-quarter round circular cross section as best viewed in FIG. 3 and is configured to couple sheath 18 above the centerline (FIG. 2) of housing 26 so that sheath 18 and throttle cable 16 are disposed parallel to and above the centerline of housing 26.

Spring 56 and pawl 54 extend downwardly from assembly 40 as shown in FIGS. 2 and 5. Spring 56 biases pawl 54 inwardly.

Housing 26 additionally and preferably includes coupling means 30 integrally formed therewith. Coupling means 30 includes six tines 58 extending outwardly from front face 42 equally spaced about fastener aperture 46. Each of tines 58 includes an outwardly extending ear 60 integrally coupled to the outboard end thereof. Tines 58 are biased to their upstanding vertical position relative to front face 42.

Body 28 is preferably formed of synthetic resin material and integrally includes cylindrical structure 62, operating lever 64 extending outwardly therefrom, and tab 66 extending outwardly from structure 62 on a side opposed from lever 64.

Cylindrical structure 62 includes a plurality of pawl-receiving detents 68 defined in the circumferencial edge thereof. The number, spacing, and depth of detents are a matter of designer choice and correspond to desired control positions of cable 16. For example, deeper detents may be defined corresponding to the positions of stop, slow, idle, maximum speed, and choke/start with a series of shallower detents for increments of lawnmower engine speed between idle and maximum. In the use of control device for controlling the gears on a bicycle, for example, detents 68 might be configured to correspond to each of the gear positions of the bicycle mechanism.

Cylindrical structure 62 also includes centrally defined coupling hole 70 the wall of which presents retaining shoulder 72.

First and second cable attachment means 32 and 34 advantageously and preferably consist of respective holes defined in cylindrical structure 62 on the circumference thereof. Attachment means 32 and 34 are disposed on opposed sides of structure 62 respectively adjacent lever 64 and tab 66. Preferably, the end of throttle cable 16 is offset to present an L-shaped configuration which is received alternately in the holes defining attachment means 32, 34. With this preferred configuration, the end of cable 16 may be pivotally coupled to body 28. Alternately, the end of cable 16 can be formed to present a hook-shaped configuration which pivotally couples the end of cable 16 with body 28. The L-shaped configuration is preferred, however, for ease in attachment and detachment of cable 16 from body 28.

To use control device 10, the user first determines whether the mechanism to be controlled requires positive or negative control cable action. For example, in use with a lawnmower, a user determines whether the throttle mechanism requires forward cable movement to open the throttle or reverse cable movement to open the throttle.

In the environment of use shown in FIGS. 1-6, the throttle mechanism (not shown) requires forward cable movement for increased throttle opening and thus requires control device 10 arranged in the positive action mode. To achieve the positive action mode, the exposed end of throttle cable 16 is inserted in first cable attachment means 32. Body 28 is then placed over housing 26 in the first configuration with handle 64 extending upwardly, as viewed in FIGS. 1-6. Body 28 is aligned so that coupling hole 70 is coaxial with fastener aperture 46. Body 28 is then pressed toward housing 26 which causes tines 58 and ears 60 to retract inwardly. As body 28 is pressed into place, tines 58 and ears 60 extend through coupling hole 70 until ears 60 engage retaining shoulder 72 at which point body 28 is rotatably coupled with housing 26 and retained by ears 60. Sheath 18 is then snapped into place within cable sheath clip 52.

Housing 26 is then placed against lawnmower handle 12 which is partially received in trough 48. Housing 26 is positioned so that lawnmower fastener hole 14 and fastener aperture 46 are axially aligned. A conventional bolt and nut can then be used through hole 14 and aperture 46 to couple housing 26 and thus control device 10 to handle 12.

In operation, handle 64 is moved forwardly to increase engine speed or rearwardly to decrease engine speed. Pawl 54, biased inwardly by spring 56, engages a corresponding detent to hold the position selected when moving lever 64. Additionally, the action of pawl 54 provides the user with a tactile indication as pawl 54 engages a detent 68.

In the extreme forward position of lever 64, lever 64 and tab 66 respectively abut stop surface 50 and rotation stop 38 to prevent further clockwise rotation of body 28 as viewed in FIG. 2. In the extreme rearward position of lever 64, lever 64 and tab 66 respectively abut stop surface 50 and pawl 54 to prevent further counterclockwise rotation of body 28.

Control device 10 also includes bail coupler 76 used to couple one end of bail 20 with device 10 thereby eliminating the need for a separate mounting structure. The inboard end of bail coupler 76 presents an hexagonal structure adapted to fit snugly within the hexagonal configuration defined by the six tines 58. The inboard end of bail coupler 76 also includes a centrally defined threaded hole 78 adapted for threadably receiving a fastener therein such as a bolt extending through hole 14 and aperture 46 to thereby fasten device 10 to lawnmower handle 12. The outboard end of bail coupler 76 includes a centrally defined bail hole 80 configured to rotatably receive one end of bail 20 for coupling thereto.

The use of the first embodiment (FIGS.. 1-6) of control device 10 in the positive action mode results in device 10 being coupled to the lefthand side of handle 12.

To use the first embodiment (FIGS. 1-6) of control device 10 in a negative action mode whereby forward movement of lever 64 results in rearward movement of cable 16, the exposed end of cable 16 is coupled with second cable attachment means 34 which is adjacent tab 66. Body 28 is then placed in the second configuration whereby lever 64 extends downwardly (with housing 26 oriented as shown in FIGS. 1-6) so that lever 64 is on the side of the centerline of housing 26 opposed from that of the first configuration. Body 28 is then pressed into place for rotatable coupling with housing 26 as described above.

Control device 10 is next coupled to the righthand side of handle 12 with lever 64 extending upwardly. In the negative action mode, control device 10 is coupled to the righthand side of handle 12 with lever 64 still extending upwardly so that forward motion of lever 64 causes rearward motion of cable 16.

As described above, the unique structure of control device 10 allows it to be assembled so that lever 64 always extends upwardly, and so that forward motion of lever 64 always corresponds to increased lawnmower engine speed, for example. Because of the versatility of control device 10, lawnmower assemblers need not keep two different types of lawnmower throttle control devices on hand but rather need only carry a control device according to the present invention which is selectively alterable to the positive or negative action mode as required.

FIG. 7 illustrates the second embodiment of control device 10. Inasmuch as all the components of the second embodiment correspond to those of the first embodiment of FIGS. 1-6, they are numbered the same.

A comparison of FIG. 7 with FIG. 2 illustrates that the only difference between the second and first embodiments is that extension assembly 40 is configured on an opposed side of the centerline of housing 26 with spring 56 and pawl 54 extending upwardly from extension assembly 40 in the second embodiment and downwardly in the first embodiment. The second embodiment as shown in FIG. 7 is assembled in a negative action mode whereby forward motion of handle 64 results in rearward motion of cable 16.

The second embodiment illustrates the versatility of the present invention. In particular, the second embodiment can be used where it is desired to have control device in a negative action mode and also mounted on the lefthand side of handle 12.

Conversely, the second embodiment can be used with control device 10 the positive action mode and coupled on the lefthand side of lawnmower handle 12. That is to say, the second embodiment can be rearranged from the negative action mode as shown in FIG. 7 to a positive action mode by removing body 28 from housing 26, recoupling body 28 with lever 64 extending downwardly and with cable 16 coupled thereto by first cable attachment means 32. In the positive action mode of the second embodiment, lever 64 still extends upwardly with device 10 coupled on the lefthand side of handle 12.

Having thus described the preferred embodiments of the present invention, what is claimed as new and desired to secured by Letters Patent is:

1. A control device for selective forward and rearward positioning of a control cable having a cable end, said control device comprising:
   a housing presenting a centerline; a rotatable body, said rotatable body presenting an axis of rotation;
   an operating lever fixedly coupled with said body; coupling means for rotatably coupling said body to said housing in a first configuration with said lever on a first side of housing centerline, and for alternately and rotatably coupling said body to said housing in a second configuration with said lever on a second opposed side of said centerline;
   first cable attachment means for pivotally coupling the cable end to said body at a first location on one side of said axis; and
   second cable attachment means for pivotally coupling the cable end to said body at a second location on a second opposed side of said axis,
   whereby said control device present a positive action mode when said body is coupled to said housing in said first configuration and when the cable end is coupled to said body at said first location so that forward motion of said lever corresponds to forward motion of the cable, and
   whereby said control device presents a negative action mode when said body is coupled to said housing in said second configuration and when the cable end is coupled to said body at said second location so that forward motion of said lever corresponds to rearward motion of the cable.

2. The control device as set forth in claim 1,
   said body including structure defining a coupling hole therethrough and a retaining shoulder circumscribing said coupling hole,
   said coupling means including a plurality of upright tines flexibly coupled with and outwardly extending from said housing and including means biasing said tines to said upright position, each of said tines including an outwardly extending retaining ear coupled with the distal end thereof, said tines being configured for extending into said coupling hole so that each of said ears engages said retaining shoulder in order to rotatably and detachably couple said body with said housing for alternate placement in said first and second configurations.

3. The control device as set forth in claim 1, the cable end presenting a L-shaped configuration,
   said first and second attachment means including respective holes defined in said body for selectively alternately receiving the cable end in order to pivotally couple the cable end with the body.

4. The control device as set forth in claim 1, said lever being integrally couple with said body.

5. The control device as set forth in claim 1, said lever and body being integrally formed of synthetic resin material.

6. The control device as set forth in claim 1, said device further including means for selectively and releasably holding the rotational position of said body relative to said housing.

7. The control device as set forth in claim 6, said holding means including a plurality of detents defined on the circumferential edge of said body, a detent-engaging pawl coupled with said housing, and means biasing said pawl toward said detents.

8. The control device as set forth in claim 1, said housing including clip means for coupling the sheath and cable thereto with said cable parallel to said centerline.

9. The control device as set forth in claim 1, said housing including means for preventing rotational movement of said lever beyond said centerline.

10. The control device as set forth in claim 1, wherein the cable is part of a lawnmower control system, the lawnmower having a tubular handle with a fastener-receiving hole defined therethrough, said housing including means for mounting said device to the lawnmower handle, said mounting means including a trough defined in said housing parallel to said centerline and adapted for receiving the lawnmower handle therein, and a fastener-receiving aperture centrally defined through said housing for coaxial alignment with the fastener-receiving hole and for receiving a fastener therethrough.

11. The control device as set forth in claim 1, wherein the lawnmower control system includes a U-shaped bail having a cylindrical end portion, said device including means for rotatably coupling said end portion to said housing

* * * * *